(12) United States Patent
Crowther et al.

(10) Patent No.: US 6,960,634 B2
(45) Date of Patent: Nov. 1, 2005

(54) METHODS FOR ADJUSTING MELT PROPERTIES OF METALLOCENE CATALYZED OLEFIN COPOLYMERS

(75) Inventors: Donna Jean Crowther, Seabrook, TX (US); Ching-Tai Lue, Houston, TX (US); Phillip Thomas Matsunaga, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 282 days.

(21) Appl. No.: 10/000,665

(22) Filed: Oct. 31, 2001

(65) Prior Publication Data

US 2003/0105251 A1 Jun. 5, 2003

(51) Int. Cl.$^7$ .................................................. C08F 4/64
(52) U.S. Cl. ..................... 526/160; 526/126; 526/165
(58) Field of Search ................................ 526/126, 160, 526/165, 348, 348.2

(56) References Cited

U.S. PATENT DOCUMENTS

| | | | |
|---|---|---|---|
| 5,385,877 A | * | 1/1995 | Fujita et al. |
| 5,767,208 A | | 6/1998 | Turner et al. ............... 526/160 |
| 5,854,362 A | | 12/1998 | Nickias et al. .............. 526/130 |
| 6,034,192 A | * | 3/2000 | Crowther |
| 6,156,856 A | * | 12/2000 | Saito et al. |
| 6,207,606 B1 | | 3/2001 | Lue et al. ................... 502/113 |
| 6,339,134 B1 | | 1/2002 | Crowther et al. ........... 526/128 |
| 6,388,115 B1 | | 5/2002 | Crowther et al. ............ 556/11 |
| 6,489,413 B1 | | 12/2002 | Floyd et al. ................ 526/160 |

FOREIGN PATENT DOCUMENTS

| | | |
|---|---|---|
| EP | 0 589 364 | 3/1994 |
| EP | 1 026 177 | 8/2000 |
| WO | WO 99/41294 | 8/1999 |
| WO | WO 99/60032 | 11/1999 |
| WO | WO 99/64476 | 12/1999 |
| WO | WO 00/37513 | 6/2000 |
| WO | WO 00/40622 | 7/2000 |
| WO | WO 00/68279 | 11/2000 |
| WO | WO 01/40324 | 6/2001 |

OTHER PUBLICATIONS

Lehtinen et al., A Comparison of (n–butCp)$_2$ZrCl$_2$ and Other Simple Metallocenes with Bridged Et(ind)$_2$ZrCl$_2$ and Me$_2$Si(Ind)$_2$ZrCl$_2$ Catalysts in Ethene/Propene Copolymerization, 33(1) Eur. Polym. J. 115–120 (1997).

Schneider et al, "Influence of Indenyl Ligand Substitution Pattern on Metallocene–Catalyzed Ethene Copolymerization with 1–Octene", 30 Macromolecules 3164–3168 (1997).

Burkhardt, Terry J. et al., "*Molecular Modeling of Metallocenes Catalysts for Isotactic Polypropylene*", Polyolefins XI, International Conference—Houston, Feb. 21–24, (1999).

Mise, Takaya et al., "*Excellent Stereoregular Isotactic Polymerizations of Propylene with C2–symmetric Silylene–bridged Metallocene Catalysts*", Chemistry Letters (10), 1853–1856, (1989).

Watanabe, Takeshi et al., "*Metallocene Polymerization Catalysts and Manufacture of Olefin Polymers by Using Them*" retrieved from STN Database, abstract & JP 2000 281709 A, Sumitomo Chemical Co., Ltd., Japan Oct. 10, 2003 2000.

Yamazaki, Hiroshi et al., "*.mu. –Oxobismetallocene Complexes, Olefin Polymerization Catalysts Containing Them, and Polymerization Method*" retrieved from STN Database, abstract & WO 2000 008036 A, Chisso Corporation, Japan Feb. 17, 2000.

Petra C. Möhring et al., *Homogeneous Group 4 metallocene Ziegler–Natta catalysts: the influence of cyclopentadienyl–ring substituents*, Journal of Organometallic Chemistry, 479, 1–29 (1994).

Hans H. Brintzinger et al., *Stereospecific Olefin Polymerization with Chiral Metallocene Catalysts*, Angew. Chem. Int. Ed. Engl. 34, 1143–1170 (1995).

Frederick J. Karol et al., *Features of Cyclopentadienyl Metal Catalysts for Ethylene Copolymerization in Gas and Liquid Phase*, Metalorganic Catalysts for Synthesis and Polymerization 629–642, (W. Kaminsky, ed., Springer 1999).

* cited by examiner

*Primary Examiner*—Caixia Lu
(74) *Attorney, Agent, or Firm*—Kevin M. Faulkner

(57) ABSTRACT

The melt strength and the melt index ratio of ethylene-based polyolefins are controlled by the lower alkyl substitution pattern of the bridged cyclopentadienyl ligands of metallocene polymerization catalyst precursor compounds.

15 Claims, No Drawings

METHODS FOR ADJUSTING MELT PROPERTIES OF METALLOCENE CATALYZED OLEFIN COPOLYMERS

FIELD OF THE INVENTION

The present invention relates to methods for adjusting melt (viscoelastic) properties of olefin copolymers and preferably ethylene copolymers prepared utilizing bridged metallocene-based catalysts. In particular, the present invention relates to methods for improving (optimizing) the melt strength and controlling the Melt Index Ratio (MIR) of ethylene-based polyolefins.

BACKGROUND OF THE INVENTION

The use of metallocene-based catalysts for the polymerization of olefins is well known. A variety of metallocene catalyst precursor compounds have been shown to be highly useful in the preparation of polyolefins, producing relatively homogeneous copolymers at good polymerization rates. In contrast to traditional Ziegler-Natta catalyst compositions, metallocene-based catalyst compositions contain one or only a few polymerization sites, thereby allowing one to tailor the properties of the finished polymer closely. However, relatively little is still known as to how individual structural features of metallocene catalyst precursor compounds influence the properties of the polymers produced thereby.

U.S. Pat. No. 6,034,192, fully incorporated herein by reference, discloses germanium bridged metallocenes such as, e.g., diethylgermanium cyclopentadienyl tetramethylcyclopentadienyl zirconium dichloride for the production of ethylene polymers with increased melt strength. PCT Patent Application Publication No. WO 99/41294, fully incorporated herein by reference, is directed to a solution polymerization process for the preparation of ethylene copolymers with a catalyst composition prepared from a bridged bis(cyclopentadienyl) zirconium compound having an unsubstituted cyclopentadienyl ligand and a multiply substituted cyclopentadienyl ligand. The process is stated to exhibit high catalyst activity, high comonomer incorporation and high diene monomer conversion rates and to be particularly suitable for the preparation of ethylene-based elastomers.

In addition, pending U.S. patent application, Ser. No. 09/306,142, filed May 6, 1999, U.S. Pat No. 6,339,134 incorporated herein by reference, discloses cyclic bridged metallocene catalyst systems, their use in a polymerization process, and products produced therefrom. Pending U.S. patent application, Ser. No. 09/955,507, filed Sep. 18, 2001, which is a continuation of U.S. patent application, Ser. No. 09/451,805 filed Dec. 12, 1999, both incorporated herein by reference, disclose cyclic germanium bridged metallocene catalyst systems.

SUMMARY OF THE INVENTION

The present invention is directed to a method of improving the melt strength of a polymer obtainable by contacting an olefin, preferably ethylene, and one or more olefin comonomers under polymerization conditions with a catalyst system comprising an activator and a metallocene catalyst precursor compound comprising a metal atom bound to two cyclopentadienyl ligands connected by a bridging group, wherein the cyclopentadienyl ligands have a total of at least 3 $C_1$–$C_2$ alkyl substituents. In a preferred embodiment, it has been determined that a metallocene catalyst compound including a 2,3,5-tri($C_1$–$C_2$ alkyl) cyclopentadienyl ligand provides for polymers having increased melt strength when compared to compounds which do not include such a ligand.

The invention is also directed to a method of controlling the MIR, $I_{21}/I_2$, of a polymer that is obtainable by contacting an olefin, preferably ethylene, and one or more olefin comonomers under polymerization conditions with a catalyst system comprising an activator and a metallocene catalyst precursor compound including two bridged cyclopentadienyl ligands having a total of 3 to 8 $C_1$–$C_2$ alkyl substituents. It has been determined that the MIR of the polymer produced by such a catalyst system is increased by decreasing the total number of said $C_1$–$C_2$ alkyl substituents. Conversely, the MIR is decreased by increasing the total number of said $C_1$–$C_2$ alkyl substituents.

DETAILED DESCRIPTION

Introduction

The present invention provides for the control and adjustment of certain melt properties, in particular, melt strength and MIR of metallocene-catalyzed ethylene-based polyolefins. Melt strength and MIR are properties which influence the behavior of these polyolefins when they are made into articles such as, e.g., blown film. It has now unexpectedly been found that both of these properties can be optimized and controlled, respectively, by using metallocene catalyst precursor compounds having two cyclopentadienyl ligands connected by a bridging moiety and varying and selecting, respectively, the number of the (lower alkyl) substituents on these cyclopentadienyl ligands.

For the purposes of this patent specification, the term "catalyst" refers to a metal compound, that when combined with an activator, polymerizes olefins. The term "activator" is used interchangeably with the term "co-catalyst", and the term "catalyst system" refers to the combination of catalyst, activator, and optionally a support material. In addition, unless otherwise stated, all percentages, parts, ratios, etc., are by weight. Also, unless otherwise stated, a reference to a compound or component (e.g., the catalyst precursor compounds used in the method of the present invention) includes the compound or component by itself, any of its individual stereoisomers (e.g., rac and meso) and any mixtures thereof, as well as any combination with other compounds or components, such as mixtures of compounds.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed. Moreover, the upper and lower values of any two or more ranges given for a specific parameter are to be understood as also disclosing the ranges formed by combining the lower value of a first range with the upper value of a second range and vice versa.

Bridged Metallocene-Based Catalyst Compounds

In the methods of the present invention, the metallocene catalyst compounds utilized contain a metal atom bound to at least one anionic leaving group and also bound to two cyclopentadienyl ligands which are bound together via a bridging group. In one embodiment, the metallocene utilized is represented by Formula I:

$$L^A(A)L^BMQ_n \qquad \text{Formula I}$$

In Formula I, M is metal atom, preferably a Group 3 to 12 metal or an atom selected from the lanthanide or actinide series of the Periodic Table of Elements, more preferably M is a Group 4, 5 or 6 transition metal, even more preferably M is a Group 4 transition metal. In a preferred embodiment, M is zirconium, hafnium or titanium and most preferably M is zirconium.

$L^A$ and $L^B$ are cyclopentadienyl ligands, bonded to M.

Independently, each $L^A$ and $L^B$ is unsubstituted or optionally substituted with a combination of $C_1$–$C_2$ alkyl substituent groups, for example methyl and ethyl groups. The $C_1$–$C_2$ alkyl substituents on the cyclopentadienyl ligands, if any, may optionally be substituted methyl and/or ethyl groups. If these groups are substituted, they are preferably halogenated, e.g., fluorinated and/or chlorinated. Illustrative, non-limiting examples of such groups are fluoromethyl, trifluoromethyl, chloromethyl, trichloromethyl and perfluoroethyl. In a preferred embodiment, the $C_1$–$C_2$ alkyl substituents are unsubstituted. In a most preferred embodiment, the $C_1$–$C_2$ alkyl substituent is a $CH_3$ group. If two or more $C_1$–$C_2$ alkyl substituents are present on the same or different rings, they may be the same or different, but are preferably the same. Even more preferred, all $C_1$–$C_2$ alkyl substituents, are $CH_3$ groups.

In one embodiment, a single substituent may be in either the 2- or the 3-position on the cyclopentadienyl ring. Further, if two or more substituents are present on the same cyclopentadienyl ring, they may be in any position to each other and with respect to the bridging group A. Accordingly, poly($C_1$–$C_2$ alkyl)substituted cyclopentadienyl ligands may be 2,3-2,4-, 3,4- and 2,5-di-substituted, 2,3,4- and 2,3,5-trisubstituted as well as tetrasubstituted. In a preferred embodiment, a 2,3,5-tri($C_1$–$C_2$ alkyl)cyclopentadienyl ligand is present if the melt strength of the polymer is to be improved (optimized).

Each Q is independently a leaving group bonded to M. Each Q may be the same or different. By way of non-limiting example, the leaving group may be a monoanionic labile ligand bonded to the metal through a sigma-bond. Non-limiting examples of Q include weak bases such as amines, phosphines, ethers, carboxylates, dienes, hydrocarbyl radicals, hydrides, halogens and combinations thereof. In one embodiment, each Q is independently hydrogen, halogen, amino, alkyl, alkoxy, aryl, aryloxy, alkenyl, arylalkyl, alkylaryl and arylalkenyl groups. In another embodiment, each Q is independently hydrogen, halogen, $C_1$–$C_{20}$ hydrocarbyl groups, dienes or a group bonded to M through a nitrogen, phosphorus or oxygen atom. In a preferred embodiment, each Q is selected from chlorine and $C_1$–$C_4$ alkyl groups.

In another embodiment, the two Q groups may be joined together to form an alkanediyl group or a conjugated diene ligand which is coordinated to the metal in a metallacyclopentene fashion; or the two additional ligands may be combined into a conjugated diene which forms a π-complex with the metal atom.

In a preferred ebodiment, each Q is independently halogen, $C_1$–$C_6$ alkyl groups (e.g., methyl and ethyl), $C_6$–$C_{10}$ aryl groups (e.g., phenyl), $C_7$–$C_{12}$ arylalkyl groups (e.g., benzyl) and $C_7$–$C_{12}$ alkylaryl groups (e.g., tolyl).

Depending on the oxidation state of the M, the value for n is 0, 1 or 2 such that Formula I above represents a neutral metallocene catalyst compound.

A is a bridging group bonded to $L^A$ and $L^B$. Non-limiting examples of bridging group A include groups containing at least one Group 13 to 16 atom(s), often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom. More preferably bridging group A contains at least one silicon atom(s) or at least one carbon atom(s).

In one embodiment, bridging group A includes radicals comprising at least one Group 14 atom such as carbon, silicon, germanium and tin, preferably carbon, silicon or germanium, most preferably at least one of silicon or germanium. One or more other non-hydrogen atoms may also be present in the bridge, such as, e.g., Group 13 and 15 to 17 elements, non-limiting examples thereof including B, N, P, O, S, F and Cl.

In another embodiment, bridging group A is represented by $R_2C$, $R_2C$—$CR_2R_2Si$, $R_2Ge$, $R_3Si(R)Si$, $R_3Si(R)C$, $R_3Si(R)Ge$ and $R_3Ge(R)C$, where the radicals R are independently selected from hydride, hydrocarbyl, substituted hydrocarbyl, disubstituted boron, disubstituted pnictogen (e.g., N or P), substituted chalcogen (e.g., O or S), and halogen. Illustrative, non-limiting examples of bridging group A include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methylethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom.

Preferred bridging groups A for the purposes of the present invention include dimethylsilyl, diethylsilyl, dimethylgermyl and diethylgermyl.

In another embodiment, bridging group A may also be cyclic, comprising, for example 4 to 10, preferably 5 to 7 ring members. The ring members may be selected from the elements mentioned above, preferably from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms (and preferably, one carbon atom) are replaced by at least one of Si, Ge, N and O, in particular, Si and Ge. The cyclopentadienyl ligands are preferably bonded to an Si and/or Ge atom, if present.

The cyclic bridging groups A may be saturated or unsaturated and/or carry one or more substituents and/or be fused to one or more other ring structures. If present, the one or more substituents are preferably selected from hydrocarbyl (e.g., alkyl such as methyl) and halogen (e.g., F, Cl). The one or more ring structures which the above cyclic bridging moieties may optionally be fused to may be saturated or unsaturated and are preferably selected from those having 4 to 10, more preferably 5, 6 or 7 ring members (preferably selected from C, N, O and S) such as, e.g., cyclopentyl, cyclohexyl and phenyl. Moreover, these ring structures may themselves be fused such as, e.g., in the case of a naphthyl group. Moreover, these (optionally fused) ring structures may carry one or more substituents. Illustrative, non-limiting examples of these substituents are hydrocarbyl (particularly alkyl) groups and halogen atoms.

In one embodiment, when the melt strength of a polymer is to be improved according to the present invention, one of $L^A$ or $L^B$ of Formula I is a tri substituted, preferably a 2,3,5 tri substituted ($C_1$–$C_2$ alkyl)cyclopentadienyl group, and the other of $L^A$ or $L^B$ is a cyclopentadienyl group which includes 0, 1, 2 or 3 $C_1$–$C_2$ alkyl substituent groups. Preferably, the other of $L^A$ and $L^B$ contains not more than two $C_1$–$C_2$ alkyl groups, preferably methyl groups, and more preferably includes not more than one $C_1$–$C_2$ alkyl group. Most preferably, the other of $L^A$ or $L^B$ is an unsubstituted cyclopentadienyl group.

In another embodiment of the method of improving the melt strength, $L^A$ and $L^B$ of Formula I, are cyclopentadienyl ligands having a total of at least 3 $C_1$–$C_2$ alkyl substituents.

In another embodiment, in Formula I, M is a Group 4 metal, preferably zirconium, $L^A$ is 2,3,5-trimethylcyclopentadienyl group and $L^B$ is an unsubstituted cyclopentadienyl group or a monomethyl cyclopentadienyl group and A is of the formula -A'$R^1R^2$— wherein A' is Si or Ge and $R^1$ and $R^2$ are independently selected from $C_1$–$C_{20}$ hydrocarbyl groups. In another embodiment, $R^1$ and $R^2$ may form a 4 to 10 membered ring together with A. In preferred embodiments $R^1$ and $R^2$ are identical $C_1$–$C_6$ alkyl or $C_6$–$C_{14}$ aryl groups. In one embodiment, A is a di($C_1$–$C_4$ alkyl)silyl or a di($C_1$–$C_4$ alkyl)germyl radical.

In one embodiment, where the MIR of a polymer is to be controlled, according to the present invention, the catalyst composition that is based on a metallocene compound of Formula I where the maximum number of $C_1$–$C_2$ alkyl (e.g., methyl) groups attached to $L^A$ and $L^B$ (i.e., 8), usually affords the lowest MIR obtainable with a series of related catalysts (i.e., those having the same metal M, the same bridging group A and the same leaving group(s) Q). Conversely, the highest MIR can usually be obtained with a catalyst precursor compound of a given series that has the lowest number of $C_1$–$C_2$ alkyl groups attached to $L^A$ and/or $L^B$ (i.e., 3), in particular if one of the cyclopentadienyl rings $L^A$ or $L^B$ is unsubstituted. Metallocene catalyst precursor compounds having a total of 7, 6, 5 or 4 $C_1$–$C_2$ alkyl groups attached to $L^A$ and $L^B$ afford intermediate values of MIR, a higher total number corresponding to a lower MIR within a given series of metallocene catalyst precursor compounds. Furthermore, a metallocene compound comprising an Si-containing bridging moiety usually affords a lower MIR (and also a lower melt strength) than its counterpart wherein the Si atom is replaced by a Ge atom.

In another embodiment of the present method for controlling the MIR, the catalyst system comprises a metallocene catalyst precursor compound including two bridged cyclopentadienyl ligands having a total of 3 to 8 $C_1$–$C_2$ alkyl substituents. According to this method, the MIR of the polymer is increased by decreasing the total number of the $C_1$–$C_2$ alkyl substituents attached to $L^A$ and $L^B$. Conversely, the MIR is decreased by increasing the total number of said $C_1$–$C_2$ alkyl substituents attached to $L^A$ and $L^B$.

In another embodiment of this method, the metallocene compound contains a Group 4 metal, preferably zirconium, all of the $C_1$–$C_2$ alkyl substituents attached to $L^A$ and/or $L^B$ are methyl groups, and A contains Si or Ge.

In another embodiment of this method, bridging group A of Formula I is represented by the formula -A'$R^1R^2$— wherein A' is Si or Ge and $R^1$ and $R^2$ are independently selected from $C_1$–$C_{20}$ hydrocarbyl groups. Alternatively, $R^1$ and $R^2$ may form a 4- to 10-membered ring together with A. In another embodiment, A is a di($C_1$–$C_4$ alkyl)silyl or a di($C_1$–$C_4$ alkyl)germyl radical. Preferably A is a dimethylsilyl or a dimethylgermyl group and each Q is independently halogen and/or $C_1$–$C_4$ alkyl groups.

For purposes of the present application, unless stated otherwise, the following terms have the meanings indicated below.

The term "alkyl", refers to a straight-chain, branched-chain or cyclic alkyl radical. Examples of such radicals include, but are not limited to, methyl, ethyl, n-propyl, isopropyl, n-butyl, isobutyl, sec-butyl, tert-butyl, pentyl, iso-amyl, hexyl, 2-ethylhexyl, octyl, cyclopentyl, cyclohexyl and the like. The cyclic alkyl radicals may be substituted with one or more straight-chain, branched-chain alkyl, cyclic alkyl radicals (such as cyclohexyl). Conversely, the straight-chain and branched-chain alkyl radicals may be substituted with one or more cyclic alkyl radicals (i.e., may be cycloalkylalkyl radicals such as cyclohexylmethyl etc.). Moreover, unless stated otherwise, the above alkyl radicals may be substituted by one or more groups preferably and independently selected from halogen (e.g., F, Cl, Br), alkoxy (e.g., methoxy, ethoxy, propoxy, butoxy and the like), hydroxy, amino, monoalkylamino (e.g., methylamino, ethylamino, propylamino and the like) and dialkylamino (e.g., dimethylamino, diethylamino, dipropylamino, diisopropylamino, piperidino and the like) and trihydrocarbylsilyl (e.g., trimethylsilyl, triphenylsilyl and the like). Unless otherwise stated, the above definition of the term "alkyl" also applies to groups comprising one or more alkyl radicals.

The term "alkenyl" refers to "alkyl" as defined above having one or more double and/or triple bonds. Examples of alkenyl radicals include, but are not limited to, ethenyl, propenyl, allyl, butenyl, propargyl, 1,4-butadienyl, isopropenyl, cyclopentenyl, cyclohexenyl, cyclooctenyl, cyclopentadienyl, cyclohexadienyl, cyclooctadienyl and the like.

The term "alkoxy" refers to an alkyl ether radical wherein the term "alkyl" is as defined above. Examples of suitable alkyl ether radicals include, but are not limited to, methoxy, ethoxy, n-propoxy, isopropoxy, n-butoxy, iso-butoxy, sec-butoxy, tert-butoxy, trifluoromethoxy and the like.

The term "aryl" refers to an aromatic radical, for example, a phenyl, naphthyl, azulenyl, phenanthryl or anthracenyl radical and the like which optionally contains one or more (e.g., 2 or 3) heteroatoms (preferably selected from N, O and S and combinations thereof) in the ring and/or carries one or more identical or different substituents, for example, alkoxy, aryl, halogen, hydroxy, amino, monoalkylamino, dialkylamino, nitro, trihydrocarbylsilyl, alkyl-CO, alkylsulfonyl, alkyl-OCO etc. Illustrative, non-limiting examples of aryl radicals are phenyl, naphthyl, fluorenyl, chlorophenyl, dichlorophenyl, fluorophenyl, perfluorophenyl, hydroxyphenyl, anisyl, biphenyl, nitrophenyl, acetylphenyl, aminophenyl, pyridyl, pyridazyl, quinolyl, and the like. When carbon numbers are given herein for aryl radicals, ring heteroatoms are counted as carbon atoms. Unless otherwise stated, the above definition of the term "aryl" also applies to groups which comprise one or more aryl radicals. For example, the term "aryloxy" means an aryl ether radical wherein the term "aryl" is as defined above.

The terms "alkylaryl" and "arylalkyl" refer to groups composed of alkyl groups and aryl groups as defined above. Illustrative, non-limiting examples thereof are tolyl, xylyl (alkylaryl), benzyl and phenethyl (arylalkyl).

The term "hydrocarbyl" encompasses alkyl, alkenyl, aryl, arylalkyl and alkylaryl groups as defined above. Preferred hydrocarbyl groups comprise 1 to 20, more preferred 1 to 10, and most preferred 1 to 6 carbon atoms. Illustrative, non-limiting examples are methyl, ethyl, propyl and phenyl.

The term "halogen" refers to fluorine, chlorine, bromine and iodine.

Activators and Activation Methods for Catalyst Precursor Compounds

The catalyst precursor compounds for use in methods of the present invention are typically activated in various ways to yield, for example, compounds having a vacant coordination site that will coordinate, insert, and polymerize olefin(s). For the purposes of this specification and the appended claims, the term "activator" is defined to be any compound which can activate any one of the catalyst precursor compounds described above by converting a neutral catalyst precursor compound to a catalytically active catalyst compound, for example, a cation. Non-limiting examples of activators include alumoxanes, aluminum alkyls, ionizing activators, which may be neutral or ionic, and conventional-type activators.

A. Alumoxane and Aluminum Alkyl Activators

In one aspect, alumoxanes are utilized as activator (cocatalyst) in the catalyst composition for use in the methods of the invention. Alumoxanes are generally oligomeric, cyclic or acyclic, compounds containing —Al(R)—O— subunits (generally about 6 to about 40), where R is an alkyl group. Illustrative, non-limiting examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum compound such as triisobutylaluminum. MMAO's are generally more soluble in aliphatic solvents and more stable during storage than MAO. There are a variety of methods for preparing alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,091,352, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. Another example of a suitable alumoxane is a modified methyl alumoxane (MMAO) activator type 3A (commercially available from Akzo Chemicals, Inc. under the trade name Modified Methylalumoxane type 3A, described in U.S. Pat. No. 5,041,584, fully incorporated herein by reference).

Illustrative, non-limiting examples of aluminum alkyl compounds which may be utilized as activators for the catalyst precursor compounds for use in the methods of the present invention include trimethylaluminum, triethylaluminum, triisobutylaluminum, tri-n-hexylaluminum, tri-n-octylaluminum and the like.

When the activator is an aluminum compound, the ratio of Al to metal M in the catalyst precursor compound usually is at least about 2:1, preferably at least about 10:1, most preferred at least about 50:1. On the other hand, the ratio Al:M usually is not higher than about 100,000:1, preferably not higher than about 10,000:1, and most preferred not higher than about 2,000:1.

B. Ionizing Activators

It is also within the scope of this invention to use an ionizing or stoichiometric activator, neutral or ionic, such as, e.g., tri(n-butylammonium-tetrakis(pentafluorophenyl) boron, a trisperfluorophenylboron metalloid precursor or a trisperfluoronaphthylboron metalloid precursor, polyhalogenated heteroborane anions (see, e.g., WO 98/43983, fully incorporated herein by reference), boric acid (see, e.g., U.S. Pat. No. 5,942,459, fully incorporated herein by reference) and combinations thereof. It is also within the scope of this invention to use neutral or ionic activators alone or in combination with alumoxane or modified alumoxane activators.

Non-limiting examples of neutral stoichiometric activators include tri-substituted boron, tellurium, aluminum, gallium, indium, and mixtures thereof. The three substituent groups may each independently be selected from alkyl, alkenyl, halogen, substituted alkyl, aryl, arylhalide, alkoxy and halide radicals. Preferably, the three groups are independently selected from halogen, mono- or polycyclic (including halosubstituted) aryl, alkyl, alkoxy and alkenyl radicals and combinations thereof. Preferred are alkyl groups having 1 to 20 carbon atoms, alkenyl groups having 1 to 20 carbon atoms, alkoxy groups having 1 to 20 carbon atoms and aryl groups having 6 to 20 carbon atoms (including substituted aryl groups). More preferably, the three groups are independently selected from alkyl groups having 1 to 4 carbon groups, phenyl and naphthyl groups. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and pending U.S. patent application Ser. No. 08/285,380, filed Aug. 3, 1994, all of which are fully incorporated herein by reference.

In a preferred embodiment, the stoichiometric activators comprise a cation and an anion component, and may be represented by the following formula:

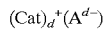

$$(Cat)_d^+(A^{d-})$$

wherein

L is an neutral Lewis base;

H is hydrogen;

(Cat)$^+$ is a Bronsted acid $A^{d-}$ is a non-coordinating anion having the charge d− d is an integer from 1 to 3.

The cation component, $(Cat)_d^+$ may include Bronsted acids such as protons or protonated Lewis bases or reducible Lewis acids capable of protonating or abstracting a moiety, such as an alkyl or aryl group, from the catalyst precursor compound, resulting in a cationic transition metal species.

The activating cation $(Cat)_d^+$ may be a Bronsted acid, capable of donating a proton to the catalyst precursor resulting in a transition metal cation, including ammonium, oxonium, phosphonium, silylium species, and mixtures thereof, preferably ammonium species derived from methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline and p-nitro-N,N-dimethylaniline; phosphonium species derived from triethylphosphine, triphenylphosphine, and diphenylphosphine; oxonium species derived from ethers such as dimethyl ether, diethyl ether, tetrahydrofuran and dioxane; sulfonium species derived from thioethers, such as diethyl thioether and tetrahydrothiophene; and mixtures thereof The activating cation may also be an abstracting moiety, $Cat_d^+$, such as a carbonium, tropylium, carbenium, ferrocenium species and mixtures thereof, preferably carbonium or ferrocenium species. Most preferably $(Cat)_d^+$ is triphenylcarbonium.

The anion component $A^{d-}$ includes those having the formula $[M^{k+}Q_n]^{d-}$ wherein k is an integer from 1 to 3; n is an integer from 2 to 6; n−k=d; M is an element selected from Group 13 of the Periodic Table of the Elements, preferably boron or aluminum, and Q is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms; more preferably each Q is a fluorinated aryl group, and most preferably each Q is a pentafluoroaryl group. Non-limiting examples of suitable $A^{d-}$ species also include diboron compounds as disclosed in U.S. Pat. No. 5,447,895, fully incorporated herein by reference.

Most preferably, the ionic stoichiometric activator $(Cat)_d^+ (A^{d-})$ is N,N-dimethylanilinium tetra(perfluorophenyl)borate or triphenylcarbenium tetra-(perfluorophenyl)borate.

In one aspect, an activation method using ionizing ionic compounds not containing an active proton but capable of producing a catalyst precursor compound cation and its non-coordinating anion are also contemplated, and are described in EP-A-0 426 637, EP-A-0 573 403 and U.S. Pat. No. 5,387,568, which are all herein fully incorporated by reference.

Supports, Carriers and General Supporting Techniques

In one aspect, the catalyst compositions used according to the present invention include a support material or carrier, or a supported activator. For example, the catalyst composition or one or more of the individual components thereof may be deposited on, contacted with, vaporized with, bonded to, incorporated within, adsorbed or absorbed in, or on, a support or carrier.

A. Support Material

The support material may be any of the conventional support materials. Preferably the support material is a porous support material selected from, for example, talc, inorganic oxides, inorganic chlorides and combinations thereof. Other support materials include resinous support materials such as polystyrene, functionalized or crosslinked organic supports, such as polystyrene divinyl benzene polyolefins or polymeric compounds, zeolites, clays, or any other organic or inorganic support material, or mixtures thereof.

The preferred support materials are inorganic oxides, more preferably those selected from oxides of Group 2, 3, 4, 5, 13 and 14 elements and combinations thereof. The more preferred supports include silica, fumed silica, alumina (see, e.g., WO 99/60033, filly incorporated herein by reference), silica-alumina and mixtures thereof. Other useful support materials include magnesia, titania, zirconia, magnesium chloride (see, e.g., U.S. Pat. No. 5,965,477, fully incorporated herein by reference), montmorillonite (see, e.g., European Patent EP-B1 0 511 665, fully incorporated herein by reference), phyllosilicate, zeolites, talc, clays (see, e.g., U.S. Pat. No. 6,034,187, fully incorporated herein by reference) and the like. Also, combinations of these support materials may be used, for example, silica-chromium, silica-alumina, silica-titania and the like. Additional non-limiting examples of support materials include the porous acrylic polymers described in EP 0 767 184 B1; nanocomposites as described in PCT WO 99/47598, aerogels as described in WO 99/48605, spherulites as described in U.S. Pat. No. 5,972,510; and polymeric beads as described in WO 99/50311, which are all herein incorporated by reference in their entireties. Another preferred support material is fumed silica available under the trade name Cabosil™ TS-610, available from Cabot Corporation. Fumed silica is typically a silica with particles 7 to 30 nanometers in size that has been treated with dimethylsilyldichloride such that a majority of the surface hydroxyl groups are capped.

It is preferred that the support material, most preferably an inorganic oxide, has a surface area in the range of from about 10 to about 700 $m^2/g$ (square meters per gram), a pore volume in the range of from about 0.1 to about 4.0 ccm/g and an average particle size in the range of from about 5 to about 500 $\mu$m (micrometers). More preferably, the surface area of the support material is from about 50 to about 500 $m^2/g$, the pore volume is from about 0.5 to about 3.5 ccm/g and the average particle size is from about 10 to about 200 $\mu$m. Most preferably the surface area of the support material is from about 100 to about 400 $m^2/g$, the pore volume is from about 0.8 to about 3.0 ccm/g and the average particle size is from about 5 to about 100 $\mu$m. The average pore size of the support typically is from 10 to 1000 Å (Ångstroms), preferably about 50 to about 500 Å, and most preferably about 75 to about 350 Å.

The support materials may be treated chemically, for example with a fluoride compound as described in WO 00/12565, which is fully incorporated herein by reference. Other supported activators are described in, for example, WO 00/13792 (fully incorporated herein by reference), that relates to supported boron containing solid acid complex.

In a preferred method of forming a supported catalyst composition component, the amount of liquid in which the activator is present is less than about four times the pore volume of the support material, more preferably less than three times, even more preferably less than two times; preferred ranges being from about 1.1 times to about 3.5 times and most preferably about 1.2 to about 3 times. In an alternative embodiment, the amount of liquid in which the activator is present is from one to less than one times the pore volume of the support material utilized in forming the supported activator.

Procedures for measuring the total pore volume of a porous support are well known in the art. Details of one of these procedures are discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956). All of these documents are fully incorporated herein by reference.

B. Supported Activators

In one embodiment, the catalyst composition includes a supported activator. Many supported activators are described in various patents and publications which include: U.S. Pat. No. 5,728,855 directed to the forming a supported oligomeric alkylaluminoxane formed by treating a trialkylaluminum with carbon dioxide prior to hydrolysis; U.S. Pat. Nos. 5,831,109 and 5,777,143 discuss a supported methylalumoxane made using a non-hydrolytic process; U.S. Pat. No. 5,731,451 relates to a process for making a supported alumoxane by oxygenation with a trialkylsiloxy moiety; U.S. Pat. No. 5,856,255 discusses forming a supported auxiliary catalyst (alumoxane or organoboron compound) at elevated temperatures and pressures; U.S. Pat. No. 5,739,368 discusses a process of heat treating alumoxane and placing it on a support; EP-A-0 545 152 relates to adding a metallocene to a supported alumoxane and adding more methylalumoxane; U.S. Pat. Nos. 5,756,416 and 6,028,151 discuss a catalyst composition of an alumoxane impregnated support and a metallocene and a bulky aluminum alkyl and methylalumoxane; EP-B1-0 662 979 discusses the use of a metallocene with a catalyst support of silica reacted with alumoxane; PCT WO 96/16092 relates to a heated support treated with alumoxane and washing to remove unfixed alumoxane; U.S. Pat. Nos. 4,912,075, 4,937,301, 5,008,228, 5,086,025, 5,147,949, 4,871,705, 5,229,478, 4,935,397, 4,937,217, and 5,057,475, and PCT WO 94/26793 all are directed to adding a metallocene to a supported activator; U.S. Pat. No. 5,902,766 relates to a supported activator having a specified distribution of alumoxane on the silica particles; U.S. Pat. No. 5,468,702 relates to aging a supported activator and adding a metallocene; U.S. Pat. No. 5,968,864 discusses treating a solid with alumoxane and introducing a metallocene; EP 0 747 430 A1 relates to a process using a metallocene on a supported methylalumoxane and trimethylaluminum; EP 0 969 019 A1 discusses the use of a metallocene and a supported activator; EP-B2-0 170 059 relates to a polymerization process using a metallocene and a organoaluminum compound, which is formed by reacting aluminum trialkyl with a water containing support; U.S. Pat. No. 5,212,232 discusses the use of a supported alumoxane and a metallocene for producing styrene based polymers; U.S. Pat. No. 5,026,797 discusses a polymerization process using a solid component of a zirconium compound and a water-insoluble porous inorganic oxide preliminarily treated with alumoxane; U.S. Pat. No. 5,910,463 relates to a process for preparing a catalyst support by combining a dehydrated support material, an alumoxane and a polyfunctional organic crosslinker; U.S. Pat. Nos. 5,332, 706, 5,473,028, 5,602,067 and 5,420,220 discuss a process for making a supported activator where the volume of alumoxane solution is less than the pore volume of the support material; WO 98/02246 discusses silica treated with a solution containing a source of aluminum and a metallocene; WO 99/03580 relates to the use of a supported alumoxane and a metallocene; EP-A1-0 953 581 discloses a heterogeneous catalytic system of a supported alumoxane and a metallocene; U.S. Pat. No. 5,015,749 discusses a process for preparing a polyhydrocarbyl-alumoxane using a porous organic or inorganic imbiber material; U.S. Pat. Nos. 5,446,001 and 5,534,474 relate to a process for preparing one or more alkylaluminoxanes immobilized on a solid, particulate inert support; and EP-A1-0 819 706 relates to a process for preparing a solid silica treated with alumoxane. All of the above-mentioned documents are fully incorporated herein by reference. Also, the following articles, also fully incorporated herein by reference, which disclose useful supported activators and methods for their preparation, may be referred to: W. Kaminsky, et al., "Polymerization of Styrene with Supported Half-Sandwich Complexes", Journal of Polymer Science Vol. 37, 2959–2968 (1999) describes a process of adsorbing a methylalumoxane to a support followed by the adsorption of a metallocene; Junting Xu, et al., "Characterization of isotactic polypropylene prepared with dimethylsilylbis(1-indenyl)zirconium dichloride supported on methylaluminoxane pretreated silica", European Polymer Journal 35 (1999) 1289–1294, discusses the use of silica treated with methylalumoxane and a metallocene; Stephen O'Brien, et al., "EXAFS analysis of a chiral alkene polymerization catalyst incorporated in the mesoporous silicate MCM-41" Chem. Commun. 1905–1906 (1997) discloses an immobilized alumoxane on a modified mesoporous silica; and F. Bonini, et al., "Propylene Polymerization through Supported Metallocene/MAO Catalysts: Kinetic Analysis and Modeling" Journal of Polymer Science, Vol. 33, 2393–2402 (1995) discusses using a methylalumoxane supported silica with a metallocene. Any of the methods discussed in these references are suitable for producing a supported activator component for use in the catalyst composition of the invention and all are incorporated herein by reference.

In another aspect, the supported activator, such as supported alumoxane, is aged for a period of time prior to use herein. In this respect, reference may be made to U.S. Pat. Nos. 5,468,702 and 5,602,217, fully incorporated herein by reference.

In one embodiment, the supported activator is in a dried state or a solid. In another embodiment, the supported activator is in a substantially dry state or a slurry, preferably a mineral oil slurry.

In another embodiment, two or more separately supported activators are used, or alternatively, two or more different activators on a single support are used.

In another embodiment, the support material, preferably partially or totally dehydrated support material, preferably 200° C. to 600° C. dehydrated silica, is contacted with an organoaluminum or alumoxane compound. Preferably, when an organoaluminum compound is used, the activator is formed in situ on and in the support material as a result of the reaction of, for example, trimethylaluminum and water.

In another embodiment, Lewis base-containing supports are reacted with a Lewis acidic activator to form a support bonded Lewis acid compound. The Lewis base hydroxyl groups of silica are exemplary of metal/metalloid oxides where this method of bonding to a support occurs. This embodiment is described in pending U.S. patent application Ser. No. 09/191,922, filed Nov. 13, 1998, which is fully incorporated herein by reference.

Other examples of supporting an activator are described in U.S. Pat. No. 5,427,991, where supported non-coordinating anions derived from trisperfluoro-phenyl boron are described; U.S. Pat. No. 5,643,847 discusses the reaction of Group 13 Lewis acid compounds with metal oxides such as silica and illustrates the reaction of trisperfluorophenyl boron with silanol groups (the hydroxyl groups of silica) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem., Vol. 29, 1603–1607 (1991), describes the olefin polymerization utility of methylalumoxane (MAO) reacted with silica ($SiO_2$) and metallocenes and describes a covalent bonding of the aluminum atom to the silica through an oxygen atom of the surface hydroxyl groups of the silica. All of the above documents are fully incorporated herein by reference.

In a preferred embodiment, a supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used to assist in removing solvent. Alternate orders of addition, such as slurrying the support material in an appropriate solvent then adding the activator, can be used.

Polymerization Process

The methods of the present invention described above are suitable for use in any prepolymerization and/or polymerization process over a wide range of temperatures and pressures. For example, the temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure processes and combinations thereof. Preferred is a gas phase polymerization of ethylene and one or more additional olefins.

In one embodiment, the process is a solution, high pressure, slurry or gas phase polymerization process of ethylene and one or more olefin monomers having from 3 to 30 carbon atoms, preferably 3 to 12 carbon atoms, and more preferably 3 to 8 carbon atoms. The invention is particularly well suited for the polymerization of ethylene and one or more olefin monomers selected from propylene, butene-1, pentene-1,4-methyl-pentene-1, octene-1, decene-1 and, in particular, 1-hexene.

Non-limiting examples of other useful comonomers include ethylenically unsaturated monomers such diolefins having 4 to 18 carbon atoms, conjugated or nonconjugated dienes, polyenes and cyclic olefins, such as, e.g., norbornene, norbornadiene, isobutylene, isoprene, styrene, alkyl-substituted styrene, ethylidene norbornene, dicyclopentadiene and cyclopentene.

In still another aspect, the molar ratio of comonomer to ethylene, $C_x/C_2$, where $C_x$ is the amount of comonomer(s) and $C_2$ is the amount of ethylene is from about 0.001 to about 0.2, preferably from about 0.002 to about 0.1, more preferably from about 0.005 to about 0.08.

Typically in a gas phase polymerization process a continuous cycle is employed where in one part of the cycle of a reactor system, a cycle gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary, by way of non-limiting example, from about 100 psig (690 kPa) to about 600 psig (4138 kPa), preferably from about 200 psig (1379 kPa) to about 400 psig (2759 kPa), more preferably in the range of from about 250 psig (1724 kPa) to about 350 psig (2414 kPa).

The reactor temperature in a gas phase process may vary, by way of non-limiting example, from about 30° C. to about 120° C., preferably from about 60° C. to about 115° C., more preferably from about 70° C. to about 110° C., and most preferably from about 70° C. to about 95° C.

Non-limiting examples of other gas phase processes contemplated by the invention include series or multistage polymerization processes. Further gas phase processes contemplated by the invention include those described in U.S. Pat. Nos. 5,627,242, 5,665,818, and 5,677,375, and European publications E-A-0 794 200 EP-B1-0 649 992, EP-A-0 802 202 and EP-B-634 421, all of which are herein fully incorporated by reference.

The methods of the present invention may also be applied for slurry polymerization processes. These processes generally use pressures in the range of from about 1 to about 50 atmospheres and even greater and temperatures in the range from about 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred slurry polymerization technique is referred to as a particle form polymerization, or a slurry process where the temperature is kept below the temperature at which the polymer goes into solution. Such technique is well known in the art, and described in, for instance, U.S. Pat. No. 3,248, 179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, and 5,986,021, which are herein fully incorporated by reference.

Examples of solution processes to which the methods of the present invention can be applied are described in U.S. Pat. Nos. 4,271,060, 5,001,205, 5,236,998, 5,589,555 and 5,977,251 and PCT WO 99/32525 and PCT WO 99/40130, all of which are fully incorporated herein by reference.

Polymer Products

The polymers produced by using the methods of the present invention can be used in a wide variety of products and end-use applications. These polymers include linear low density polyethylene, elastomers, plastomers, high density polyethylenes, medium density polyethylenes and low density polyethylenes.

These ethylene based polymers have a density in the range of from about 086 g/cc to about 0.97 g/ccm, preferably in the range of from about 0.88 g/cc to about 0.965 g/ccm, more preferably from about 0.900 g/ccm to about 0.96 g/ccm, more preferably from about 0.905 g/ccm to about 0.95 g/ccm, more preferably from about 0.910 g/cc to about 0.940 g/ccm, and most preferably at least about 0.915 g/ccm. In another embodiment, the ethylene based polymers have a density of at least 0.900 g/ccm. Most preferably the density is not higher than about 0.930 g/ccm or even not higher than about 0.925 g/ccm.

Moreover, the polymers typically have a molecular weight distribution, weight average molecular weight to number average molecular weight ($M_w/M_n$), as determined by GPC using techniques well known in the art, of from about 1.5 to about 15, particularly about 2 to about 12, more preferably about 3 to about 10, and most preferably from about 2.5 to about 8.

In one embodiment, the polymers resulting from the methods of the present invention have a melt index (MI or $I_2$), measured according to ASTM D1238, Condition E at 190° C. with a load of 2.16 kg, in the range from no measurable flow to about 100 dg/min, more preferably from about 0.01 dg/min to about 50 dg/min, even more preferably from about 0.1 dg/min to about 10 dg/min, and most preferably from about 0.2 dg/min to about 5 dg/min. In another embodiment, the polymer has a MI of greater than 0.01.

The polymers which are made by using the methods of the invention preferably have a melt index ratio ($I_{21}/I_2$) ($I_{21}$ is measured according to ASTM D 1238, Condition F at 190° C. with a load of 21.6 kg) of not lower than about 20, more preferably not lower than about 30, for example, not lower that about 40, or even not lower than about 50. The MIR usually is not higher than about 100, preferably not higher than about 90, for example, not higher than about 80, or even not higher than about 70, although the MIR may be as high as about 150, about 200 or even higher. In another embodiment, the polymer has a MIR of greater than 20.

Furthermore, the improved melt strength of the polymers made by using methods of the present invention usually is kept above about 6.0 cN, and is preferably about 8.0 cN, more preferably at least about 8.4 cN, more preferably at least about 8.8 cN and most preferably at least about 8.9 cN. The melt strength is determined according to the method described further below in the experimental section.

Polymers produced by using the methods of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include those made by melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

The following examples further illustrate the invention.

EXAMPLES

Testing Procedures

Melt Strength Test Method A—Melt strength is measured with an Instron capillary rheometer in conjunction with the Goettfert Rheotens melt strength apparatus. A polymer melt strand extruded from the capillary die is gripped between two counter-rotating wheels on the apparatus. The take-up speed is increased at a constant acceleration of 24 mm/sec$^2$, which is controlled by the Acceleration Programmer (Model 45917, at a setting of 12). The maximum pulling force (in the unit of cN) achieved before the strand breaks or starts to show draw-resonance is determined as the melt strength.

The temperature of the rheometer is set at 190° C. The barrel has a diameter of 0.375" (9.525 mm). The capillary die has a length of one inch (25.4 mm) and a diameter of 0.06" (1.5 mm). The polymer melt is extruded from the die at a piston speed of 3 inch/min (1.27 mm/sec). The apparent shear rate for the melt in the die is, therefore, 260 sec$^{-1}$ and the speed at die exit is 49.6 mm/sec. The distance between the die exit and the wheel contact point should be 3.94 inches (100 mm).

Method Strength Test Method B—Melt strength is measured with a capillary rheometer (RHEO-TESTER 1000) in conjunction with the Goettfert Rheotens melt strength apparatus (RHEOTENS 71.97). A polymer melt strand extruded from the capillary die is gripped between two counter-rotating wheels on the apparatus. The take-up speed is increased at a constant acceleration of 12 mm/sec$^2$, which is controlled by the WinRHEO program provided by Goettfert. The maximum pulling force (in the unit of cN) achieved before the strand breaks or starts to show draw-resonance is determined as the melt strength.

The temperature of the rheometer is set at 190° C. The barrel has a diameter of 12 mm. The capillary die has a length of 30 mm and a diameter of 2 mm. The polymer melt is extruded from the die at a piston speed of 0.49 mm/sec. The apparent shear rate for the melt in the die is, therefore, 70 sec$^{-1}$ and the speed at die exit is 17.5 mm/sec. The distance between the die exit and the wheel contact point should be 125 mm.

Melt Index—Melt Index (MI), $I_2$, was measured by the procedure according to ASTM D 1238, Condition E at 190° C. with a load of 2.16 kg.

Melt Index Ratio—Melt Index Ratio (MIR) is the ratio $I_{21}/I_2$ ($I_{21}$ was measured according to ASTM D 1238, Condition F at 190° C. with a load of 21.6 kg).

Molecular Weights—Molecular weights (e.g., Mn, Mw & Mz) and molecular weight distribution (e.g., Mw/Mn & Mz/Mw) were measured by Gel Permeation Chromatography using a Waters 150 Gel Permeation Chromatograph equipped with a differential refractive index detector and calibrated using polystyrene standards. Samples were run in 1,2,4-trichlorobenzene at 135° C. with a concentration of 1.0–1.5 mg/ml. The injection volume was 300 µl. The column set was either three Polymer Laboratories PLGEL Mixed-A columns (with flow rate of 1 ml/min) or three Polymer Laboratories PLGEL Mixed-B columns (with flow rate of 0.5 ml/min). This general technique is discussed in "Liquid Chromatography of Polymers and Related Materials III", J. Cazes Ed., Marcel Decker, 1981, page 207.

Density—Density was measured according to ASTM D 1505.

Catalyst Preparation

Silica gel was either Davison 948, calcined at 600° C. or Crosfield ES-70, calcined at 600° C. MAO was purchased from Albermarle as a 30 wt % solution in toluene. Anhydrous solvents were purchased from Aldrich and used without further purification. Tetramethylcyclopentadienyldimethylchlorosilane and 1,3 dimethylcyclopentadienyl lithium were purchased from Boulder. A typical synthesis of a metallocene and its support for screening in the gas-phase process follows.

Synthesis of Metallocene No. 1—dimethylsilyl(tetramethylcyclopentadienyl)(1,3-dimethylcyclopentadienyl)zirconiumdichloride To a solution of tetramethylcyclopentadienyldimethylchlorosilane (6.5 g) in tetrahydrofuran (100 ml) was added 1,3-dimethylcyclopentadienyl lithium (3.0 g). The mixture was allowed to stir for 12 h and then volatiles were removed in vacuo. The crude reaction mixture was extracted with pentane (2×50 ml), filtered and to the extracts was added 30 ml diethyl ether. The ligand was deprotonated with n-BuLi (25 ml, 2.5 M). The dilithio salt was collected on a medium glass frit and washed with pentane (3.6 g). It was dissolved in diethyl ether (100 ml) and reacted with $ZrCl_4$ (2.9 g) The reaction mixture was filtered after 2 hours and the filtrate reduced and pentane added. The filtrate was cooled to −35° C. and the next day product (title compound) was collected as a white solid (1.3 g).

The above product (0.73 g) was weighed into a beaker with a stir bar and reacted with MAO (53.5 g, 30 wt % in toluene). Additional toluene was added (53.5 g). The reaction mixture was homogeneous after about 10 min. and the stirring was stopped. Incremental amounts of silica gel (40 g) were added and mixed with a spatula. The resulting mud was dried in vacuo until free-flowing and transferred into a bomb for screening purposes.

Synthesis of Metallocenes Nos. 2–28

Metallocenes Nos. 2–28, were synthesized in a similar manner as utilized to prepare Metallocene No. 1. Metallocenes Nos. 2–28 were synthesized and then reacted with MAO and supported on silica to prepare a catalyst composition for use in the methods of the present invention. Table 1 below lists the metallocenes catalyst compounds prepared. Table 2 below summarizes the reagents used for the preparation of the corresponding catalyst systems.

TABLE 2

Reagents for Preparation of Catalyst Composition

| Composition | Metallocene/g | 30% MAO, g | Toluene, g | Silica, g | Silica Type |
| --- | --- | --- | --- | --- | --- |
| 1 | 0.74 | 53.5 | 53.5 | 40 | D |
| 2 | 0.75 | 53.5 | 53.5 | 40 | D |
| 3 | 0.73 | 53.5 | 53.5 | 40 | D |
| 4 | 1.62 | 108.1 | 108.1 | 80 | D |
| 5 | 1.18 | 53.5 | 54 | 40 | D |
| 6 | 0.45 | 34 | 34 | 25 | Cr |
| 7 | 0.39 | 53.5 | 53.5 | 40 | D |
| 8 | 0.71 | 53.5 | 53.5 | 40 | D |
| 9 | 0.48 | 33.5 | 33.5 | 25 | D |
| 10 | 0.51 | 34 | 34 | 25 | Cr |
| 11 | 0.79 | 53.5 | 53.5 | 40 | D |
| 12 | 0.52 | 34.5 | 34.5 | 25 | D |
| 13 | 0.6 | 34 | 34 | 25 | Cr |
| 14 | 0.62 | 34 | 34 | 25 | Cr |
| 15 | 0.42 | 25 | 25 | 26 | D |
| 16 | 0.45 | 25 | 25 | 26 | D |
| 17 | 0.6 | 26 | 26 | 25 | D |
| 18 | 0.6 | 24 | 24 | 25 | D |
| 19 | 0.51 | 25.8 | 26 | 25 | D |
| 20 | 0.78 | 31.9 | 32.7 | 25 | D |
| 21 | 0.73 | 32.3 | 33.2 | 25.4 | D |
| 22 | 1.15 | 51.0 | 52.3 | 40 | D |
| 23 | 1.13 | 51.0 | 52.3 | 40 | D |
| 24 | 1.19 | 51.0 | 52.3 | 40 | D |
| 25 | 0.65 | 31.4 | 33.1 | 25 | D |
| 26 | 0.77 | 37.6 | 39.7 | 30 | D |
| 27 | 0.84 | 37.6 | 39.7 | 30 | D |
| 28 | 0.75 | 35.7 | 37.8 | 28.6 | D |

D = Davison 948, Cr = Crosfield ES-70
Davison 948 is available from Grace Davison, Baltimore MD.
Crosfield ES-70 is available from Ineos, United Kingdom.

TABLE 1

Synthesized Metallocenes of Structure $(Cp^1—X—Cp^2)ZrCl_2$

| Metallocene | $Cp^1$ | $Cp^2$ | X |
| --- | --- | --- | --- |
| 1 | $Me_4C_5$ | $Me_4C_5$ | $SiMe_2$ |
| 2 | $Me_4C_5$ | $2,3,5-Me_3HC_5$ | $SiMe_2$ |
| 3 | $Me_4C_5$ | $2,4-Me_2H_2C_5$ | $SiMe_2$ |
| 4 | $Me_4C_5$ | $3-MeH_3C_5$ | $SiMe_2$ |
| 5 | $Me_4C_5$ | $H_4C_5$ | $SiMe_2$ |
| 6 | $2,3,5-Me_3HC_5$ | $H_4C_5$ | $SiMe_2$ |
| 7 | $Me_4C_5$ | $H_4C_5$ | 1,1-silacyclobutanediyl |
| 8 | $Me_4C_5$ | $H_4C_5$ | 1,1-silacyclopentanediyl |
| 9 | $Me_4C_5$ | $2,3,5-Me_3HC_5$ | 1,1-silacyclobutanediyl |
| 10 | $2,3,5-Me_3HC_5$ | $2,3,5-Me_3HC_5$ | 1,1-silacyclobutanediyl |
| 11 | $Me_4C_5$ | $H_4C_5$ | $GeEt_2$ |
| 12 | $Me_4C_5$ | $Me_4C_5$ | $GeMe_2$ |
| 13 | $Me_4C_5$ | $H_4C_5$ | $Ge(n-Bu)_2$ |
| 14 | $Me_4C_5$ | $Me_4C_5$ | $Ge(n-Bu)_2$ |
| 15 | $2,3,5-Me_3HC_5$ | $H_4C_5$ | $Si(n-Hex)_2$ |
| 16 | $2,3,5-Me_3HC_5$ | $H_4C_5$ | 1,1-silacyclopentanediyl |
| 17 | $Me_4C_5$ | $Me_4C_5$ | 1,1-(3,4-dimethyl-1-germacyclopent-3-enediyl) |
| 18 | $Me_4C_5$ | $2,3,5-Me_3HC_5$ | 1,1-(3,4-dimethyl-1-germacyclopent-3-enediyl) |
| 19 | $2,3,5-Me_3HC_5$ | $H_4C_5$ | $GeEt_2$ |
| 20 | $Me_4C_5$ | $Me_4C_5$ | 1,1-(3,4-benzo-1-germacyclopentanediyl) |
| 21 | $Me_4C_5$ | $Me_4C_5$ | 1,1-(3,4-benzo-1-silacyclopentanediyl) |
| 22 | $Me_4C_5$ | $Me_4C_5$ | 1,1-germacyclopentanediyl |
| 23 | $Me_4C_5$ | $H_4C_5$ | 1,1-(3,4-benzo-1-germacyclopentanediyl) |
| 24 | $2,3,5-Me_3HC_5$ | $2,3,5-Me_3HC_5$ | 1,1-(3,4-benzo-1-germacyclopentanediyl) |
| 25 | $Me_4C_5$ | $H_4C_5$ | 1,1-(3,4-benzo-1-silacyclopentanediyl) |
| 26 | $2,3,5-Me_3HC_5$ | $2,3,5-Me_3HC_5$ | $GeMe_2$ |
| 27 | $Me_4C_5$ | $2,3,5-Me_3HC_5$ | 1,1-(3,4-benzo-1-silacyclopentanediyl) |
| 28 | $Me_4C_5$ | $Me_4C_5$ | 1,1-silacyclopentanediyl |

In Table 1 Me = $CH_3$, Et = $C_2H_5$, n-Bu = n-$C_4H_9$, n-Hex = n-$C_6H_{13}$

Polymerizations

All catalyst compositions were screened in a fluidized bed reactor equipped with devices for temperature control, catalyst feeding or injection equipment, gas chromatograph analyzer for monitoring and controlling monomer and gas feeds and equipment for polymer sampling and collecting. The reactor consisted of a 6 inch (15.24 cm) diameter bed section increasing to 10 inches (25.4 cm) at the reactor top. Gas came in through a perforated distributor plate allowing fluidization of the bed contents and polymer sample was discharged at the reactor top. The comonomer used was 1-hexene.

Table 3 below summarizes the polymerization conditions and the properties of the obtained ethylene/1-hexene copolymers.

TABLE 3

Polymerization Conditions and Polymer Properties

| Composition | 1 | 2 | 3 | 4 | 5 | 6 | 15 |
|---|---|---|---|---|---|---|---|
| Temp., F. | 175 | 165 | 175 | 175 | 175 | 175 | 175 |
| Pressure, psig | 300 | 300 | 300 | 300 | 300 | 300 | 300 |
| $C_2$ mol % | 35 | 25.1 | 35.2 | 34.5 | 35 | 35 | 35 |
| $H_2$ mol ppm | 106 | 94 | 313 | 306 | 659 | 771 | 435 |
| $H_2/C_2$ ratio | 3 | 3.7 | 8.9 | 8.9 | 18.9 | 22 | 12.4 |
| $C_6$ mol % | 0.87 | 0.3 | 0.52 | 0.46 | 0.47 | 0.33 | 0.35 |
| $C_6/C_2$ ratio | 0.025 | 0.012 | 0.015 | 0.013 | 0.013 | 0.009 | 0.01 |
| Bed Weight, g | 1930 | 1835 | 1818 | 1983 | 2399 | 1890 | 1889 |
| Residence Time, hr | 4.8 | 4.6 | 3.9 | 3.2 | 8.2 | 3.9 | 4.3 |
| Gas Velocity | 1.57 | 1.77 | 1.56 | 1.56 | 1.58 | 1.61 | 1.6 |
| Prod. Rate g/hr | 400 | 399 | 465 | 611 | 293 | 481 | 440 |
| Bulk Density | 0.388 | 0.458 | 0.49 | na | na | 0.502 | 0.4365 |
| Productivity g/g | 3458 | 1532 | 2233 | 2640 | 271 | 1618 | 868 |
| MI, dg/min | 1.7 | 1.31 | 2.17 | 2.1 | 2.4 | 0.81 | 3.1 |
| MIR | 31.7 | 37 | 40 | 44 | 51.1 | 56 | 30.2 |
| MS, cN | 7.4 (6.5) | 8.4 | 4.9 | 7.6 | 4.2 | 11.2 (10.8) | 8.1 |
| MS Method | A (B) | A | A | A | A | A (B) | A |
| Density, g/ccm | 0.9193 | 0.9196 | 0.9233 | 0.9183 | 0.9185 | 0.9153 | 0.9195 |
| $M_w$ | 109,000 | 140,000 | 113,600 | 149,700 | 98,000 | — | — |
| $M_w/M_n$ | 5.8 | 6.5 | 7.5 | 7.3 | 5.0 | — | — |

| Composition | 11 | 12 | 13 | 19 | 14 | 26 |
|---|---|---|---|---|---|---|
| Temp., F. | 175 | 175 | 175 | 175 | 175 | 175 |
| Pressure, psig | 300 | 300 | 300 | 300 | 300 | 300 |
| $C_2$ mol % | 35 | 35 | 35.2 | 34.9 | 35 | 35 |
| $H_2$ mol ppm | 540 | 88 | 567 | 250 | 60 | 264 |
| $H_2/C_2$ ratio | 15.4 | 2.5 | 16.1 | 7.2 | 1.7 | 7.5 |
| $C_6$ mol % | 0.37 | 1 | 0.43 | 0.53 | 0.77 | 0.42 |
| $C_6/C_2$ ratio | 0.011 | 0.029 | 0.012 | 0.015 | 0.022 | 0.012 |
| Bed Weight, g | 1943 | 1951 | 1890 | 1929 | 1924 | 1953 |
| Residence Time, hr | 5.4 | 7 | 6 | 9.6 | 2.8 | 4.3 |
| Gas Velocity | 1.61 | 1.59 | 1.57 | 1.56 | 1.57 | 1.61 |
| Prod. Rate g/hr | 360 | 278 | 312 | 202 | 676 | 457 |
| Bulk Density | 0.4063 | 0.2988 | na | na | 0.3755 | na |
| Productivity g/g | 1729 | 373 | 630 | 244 | 3895 | 1222 |
| MI, dg/min | 3.2 | 1.1 | 1.4 | 1.2 | 1.7 | 2.2 |
| MIR | 46 | 30 | 51 | 46 | 27 | 43 |
| MS, cN | 7.2 | 10.4 | 8.2 | 23.1 | 6.8 | 9.1 |
| MS Method | A | A | A | A | A | B |
| Density, g/ccm | 0.9185 | 0.9186 | 0.9214 | 0.9220 | 0.9181 | 0.9230 |
| $M_w$ | | | | | | 105,700 |
| $M_W/M_N$ | | | | | | 11.6 |

| Composition | 7 | 8 | 9 | 10 | 16 | 17 | 18 |
|---|---|---|---|---|---|---|---|
| Temp., F. | 175 | 175 | 175 | 175 | 175 | 175 | 175 |
| Pressure, psig | 300 | 300 | 300 | 300 | 300 | 300 | 300 |
| $C_2$ mol % | 35 | 35.1 | 35 | 34.9 | 35.1 | 35.1 | 35 |
| $H_2$ mol ppm | 1024 | 904 | 686 | 720 | 436 | 384 | 323 |
| $H_2/C_2$ ratio | 29.3 | 25.7 | 19.6 | 20.6 | 12.4 | 10.9 | 9.2 |
| $C_6$ mol % | 0.33 | 0.63 | 0.34 | 0.31 | 0.32 | 0.99 | 0.58 |
| $C_6/C_2$ ratio | 0.009 | 0.018 | 0.01 | 0.009 | 0.009 | 0.028 | 0.017 |
| Bed Weight, g | 1874 | 1868 | 1918 | 1881 | 1899 | 1947 | 1926 |
| Residence Time, hr | 2.6 | 8.1 | 4.4 | 6 | 4.5 | 5 | 4.8 |
| Gas Velocity | 1.6 | 1.6 | 1.59 | 1.57 | 1.59 | 1.58 | 1.61 |
| Prod. Rate g/hr | 713 | 231 | 440 | 315 | 418 | 391 | 404 |
| Bulk Density | 0.4798 | na | 0.4503 | 0.486 | na | na | 0.3815 |
| Productivity g/g | 959 | 444 | 1267 | 357 | 683 | 750 | 946 |
| MI, dg/min | 1.6 | 0.7 | 0.54 | 0.4 | 2.1 | 0.64 | 1.3 |
| MIR | 83 | 90 | 174 | 123 | 33.3 | 77 | 56.2 |
| MS, cN | 5.5 | 5.8 | 5.8 | 9.1 | 11.8 | 8.9 (8.3) | 8 |
| MS Method | A | A | A | A | B | A (B) | B |
| Density, g/ccm | 0.9232 | 0.9199 | 0.9235 | 0.9184 | 0.9195 | 0.9189 | 0.9196 |

TABLE 3-continued

Polymerization Conditions and Polymer Properties

| Composition | 28 | 25 | 27 | 21 | 22 | 23 | 24 | 20 |
|---|---|---|---|---|---|---|---|---|
| Temp., F. | 175 | 175 | 175 | 175 | 175 | 175 | 175 | 175 |
| Pressure, psig | 300 | 300 | 300 | 300 | 300 | 300 | 300 | 300 |
| $C_2$ mol % | 35.3 | 35.0 | 35.1 | 35.1 | 35.0 | 35.0 | 35.0 | 35.0 |
| $H_2$ mol ppm | 454 | 817 | 565 | 375 | 271 | 992 | 396 | 129 |
| $H_2/C_2$ ratio | 12.8 | 23.3 | 16.1 | 10.7 | 7.7 | 28.3 | 11.3 | 3.7 |
| $C_6$ mol % | 0.77 | 0.40 | 0.56 | 0.58 | 0.89 | 0.42 | 0.30 | 0.62 |
| $C_6/C_2$ ratio | 0.022 | 0.011 | 0.016 | 0.017 | 0.025 | 0.012 | 0.009 | 0.018 |
| Bed Weight, g | 1961 | 1895 | 1897 | 1926 | 1920 | 1903 | 1920 | 1903 |
| Residence Time, hr | 4.7 | 5.7 | 4.1 | 4.1 | 5.7 | 4.4 | 4.6 | 3.6 |
| Gas Velocity | 1.66 | 1.64 | 1.59 | 1.64 | 1.64 | 1.59 | 1.61 | 1.57 |
| Prod. Rate g/hr | 415 | 331 | 467 | 469 | 337 | 428 | 420 | 533 |
| Bulk Density | 0.35 | na | 0.43 | na | na | 0.44 | 0.48 | 0.36 |
| Productivity g/g | 684 | 443 | 788 | 1216 | 788 | 917 | 1174 | 1697 |
| MI, dg/min | 1.3 | 0.57 | 1.6 | 0.45 | 0.98 | 1.4 | 1.3 | 1.2 |
| MIR | 59 | 97 | 79 | 85 | 42 | 61 | 53 | 37 |
| MS, cN | 6.9 | 10.0 | 6.3 | 8.7 | 7.6 | 7.2 | 8.9 | 9.5 |
| MS Method | B | B | B | B | B | B | B | A |
| Density, g/ccm | 0.924 | 0.921 | 0.921 | 0.925 | 0.923 | 0.920 | 0.923 | 0.923 |
| $M_W$ | 102,200 | 107,400 | 130,000 | 111,400 | 116,400 | 98,800 | 125,900 | 113,200 |
| $M_W/M_N$ | 3.2 | 5.1 | 4.7 | 4.4 | 3.4 | 5.5 | 9.8 | 3.7 |

A comparison of the results of Table 3 shows that catalyst compositions derived from metallocene catalyst precursor compounds wherein one of the cyclopentadienyl ligands is 2,3,5-trisubstituted and the other one is unsubstituted (or not fully substituted, respectively) afford ethylene/1-hexene copolymers having a melt strength which in most cases is significantly higher than that achieved with the remaining catalyst compositions tested, irrespective of the type of the bridging group.

Furthermore, as can be seen, for example, from a comparison of the MIR data obtained with compositions 1 to 5 (derived from metallocene catalyst precursor compounds having one tetramethylcyclopentadienyl ligand and one cyclopentadienyl ligand substituted by 4, 3, 2, 1 and 0 methyl groups, respectively), the MIR values of the ethylene copolymers increase with decreasing substitution of the second cyclopentadienyl ligand.

While the present invention has been described and illustrated by reference to particular embodiments, it will be appreciated by those of ordinary skill in the art, that the invention lends itself to many different variations not illustrated herein. For these reasons, then, reference should be made solely to the appended claims for purposes of determining the true scope of the present invention.

We claim:

1. A method of controlling the Melt Index Ratio of a polyolefin from about 30 to about 150, the method comprising contacting ethylene and one or more olefin comonomers having 3 to 12 carbon atoms under polymerization conditions with a catalyst system comprising an activator and a metallocene catalyst precursor compound; the metallocene catalyst precursor compound comprising a Group 4 transition metal atom bound to two cyclopentadienyl ligands, wherein the two cyclopentadienyl ligands are bridged to each other through a bridging group represented by the formula -A'$R^1R^2$— wherein A' is selected from Si and Ge, and $R^1$ and $R^2$ are independently selected from $C_1$–$C_{20}$ hydrocarbyl groups; and wherein the two bridged ligands have a total number of substituents in the range of from 3 to 8 $C_1$–$C_2$ alkyl substituents; and isolating the polyolefin; characterized in that the Melt Index Ratio of the polyolefin produced by the catalyst system is increased by decreasing the total number of said $C_1$ to $C_2$ alkyl substituents on the metallocene catalyst precursor compound for polyolefins having a density of from about 0.915 to about 0.930 g/cc.

2. The method of claim 1, wherein the metallocene compound comprises a first cyclopentadienyl ligand having three $C_1$–$C_2$ alkyl substituents.

3. The method of claim 1, wherein the first ligand is a 2,3,5 trimethyl cyclopentadienyl ligand.

4. The method of claim 1, wherein the metal atom is also bound to at least one anionic leaving group selected from the group consisting of hydrogen, halogen, amino, alkyl, alkoxy, aryl, aryloxy, alkenyl, arylalkyl, alkylaryl, arylalkenyl groups and combinations thereof.

5. The method of claim 1, wherein the activator is selected from the group consisting of methyl alumoxane, modified methyl alumoxane, isobutyl alumoxane or combinations thereof.

6. The method of claim 1, wherein the polymerization conditions are gas phase or a slurry phase polymerization process.

7. The method of claim 1, wherein the polymerization conditions are gas phase conditions and the molar ratio of comonomer to ethylene is from 0.002 to 0.1 in the reaction system.

8. The method of claim 1, wherein the melt strength of the polymer is kept above 6.0 cN.

9. The method of claim 1, wherein the melt strength of the polymer is kept above 8.0 cN.

10. The method of claim 1, wherein all of said $C_1$–$C_2$ alkyl groups are methyl groups.

11. The method of claim 1, wherein the bridging group is selected from di($C_1$–$C_2$ alkyl)silyl and di($C_1$–$C_2$ alkyl)-germyl radicals.

12. The method of claim 1, wherein the polyolefin has a molecular weight distribution of from 3 to 10.

13. The method of claim 1, wherein the polyolefin has a Melt Index of greater than 0.01 dg/min.

14. The method of claim 1, wherein the catalyst system comprises a support.

15. The method of claim 14, wherein the support is silica.

* * * * *